United States Patent
Yasuda et al.

(10) Patent No.: US 6,634,265 B2
(45) Date of Patent: Oct. 21, 2003

(54) APPARATUS FOR EXCHANGING WORKPIECES

(75) Inventors: Shinsaku Yasuda, Dusseldorf (DE); Katsuhisa Ishioka, Dusseldorf (DE)

(73) Assignee: Okuma Corporation, Aichi (JP)

( * ) Notice: Subject to any disclaimer, the term of this patent is extended or adjusted under 35 U.S.C. 154(b) by 0 days.

(21) Appl. No.: 09/966,008

(22) Filed: Sep. 28, 2001

(65) Prior Publication Data

US 2002/0050194 A1 May 2, 2002

(30) Foreign Application Priority Data

Sep. 29, 2000 (JP) ........................................ 2000-299965

(51) Int. Cl.[7] ............................. B23B 5/00; B23B 13/00
(52) U.S. Cl. .......................................... 82/124; 82/122
(58) Field of Search ................ 82/122, 124; 198/346.1, 198/346.2; 414/222.01, 222.07

(56) References Cited

U.S. PATENT DOCUMENTS

| | | | | |
|---|---|---|---|---|
| 3,771,390 A | * | 11/1973 | Carignan | 82/124 |
| 4,097,984 A | * | 7/1978 | Petrov | 29/563 |
| 4,302,144 A | * | 11/1981 | Hallqvist | 414/590 |
| 4,797,991 A | * | 1/1989 | Yamaguchi et al. | 483/14 |
| 4,821,612 A | * | 4/1989 | Myers | 82/1.11 |
| 4,991,706 A | * | 2/1991 | Kitamura | 198/346.1 |
| 5,081,889 A | * | 1/1992 | Takano et al. | 82/122 |
| 5,347,704 A | * | 9/1994 | Everlove et al. | 29/563 |
| 5,704,262 A | * | 1/1998 | Baumbusch et al. | 82/124 |

* cited by examiner

Primary Examiner—A. L. Wellington
Assistant Examiner—Brian D. Walsh
(74) Attorney, Agent, or Firm—Pearson & Pearson, LLP (57) ABSTRACT

The invention provides an apparatus for exchanging workpieces which reduces the time required for exchanging workpieces by cutting down to a minimum the moving distance and the waiting time of a workpiece transport means. By the movement of a headstock 1, a chuck 2 transports a finished workpiece WA and an unfinished workpiece WB between a machining section near a tool rest 3 and a conveyer 4. The conveyer 4 conveys the finished workpiece WA from a workpiece exchanging position 4a and conveys the unfinished workpiece WB into the workpiece exchanging position 4a. A shift cylinder 11 transfers the unfinished workpiece WS from the conveyer 4 to a waiting station 6. An elevating plate 7 and a slider 9 transfer the finished workpiece WA from the chuck 2 to the conveyer 4. A lift cylinder 13 transfers the unfinished workpiece WB from the waiting station 6 to the chuck 2.

4 Claims, 7 Drawing Sheets

APPARATUS FOR EXCHANGING WORKPIECES

BACKGROUND OF THE INVENTION

1. Field of the Invention

The present invention relates to an apparatus for exchanging workpieces of a machine tool.

2. Description of the Related Art

Figure 16:
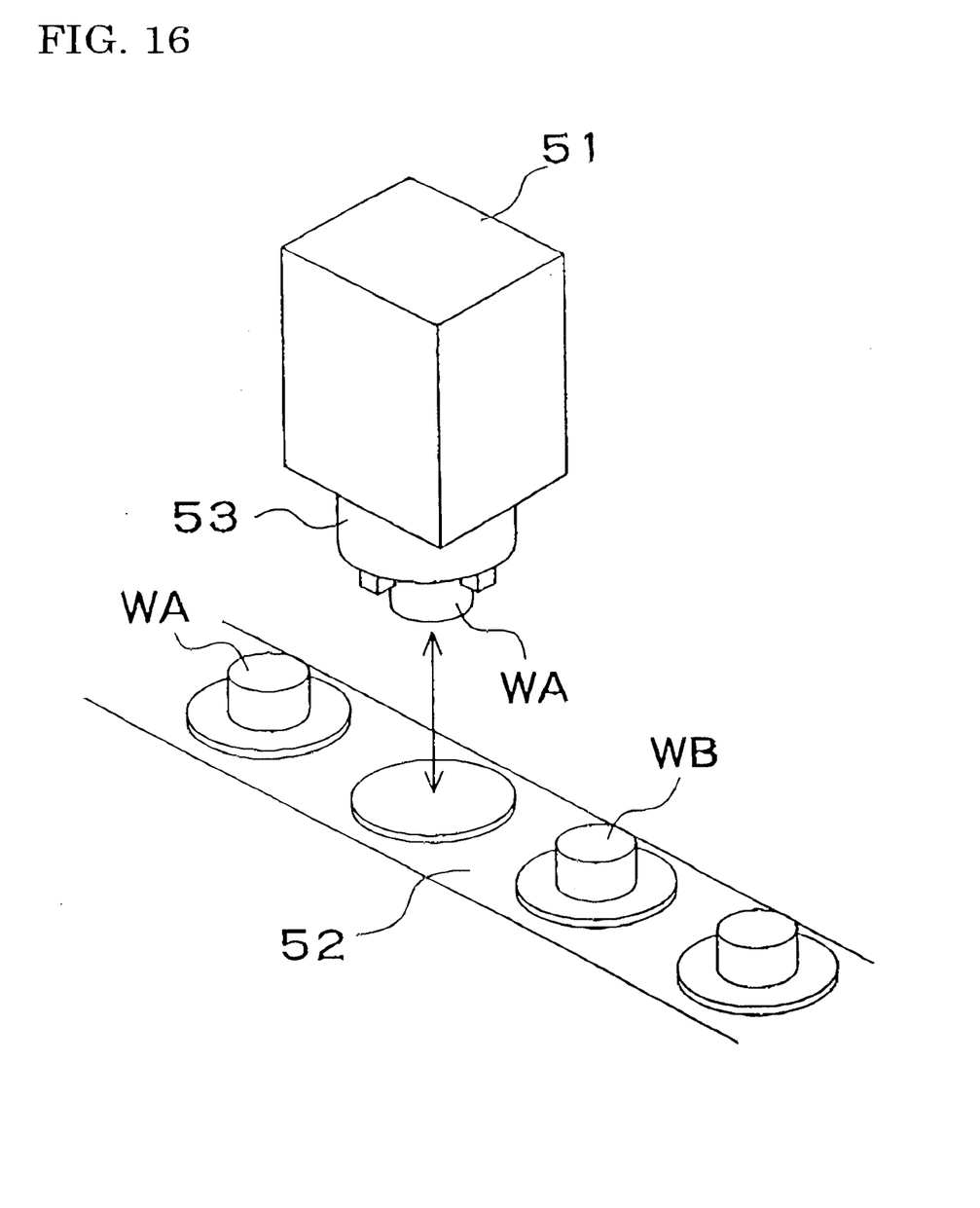
FIG. 16 is a perspective view of a conventional apparatus for exchanging workpieces.

In conventional machine tools, techniques for exchanging workpieces by moving a workpiece transport means such as headstocks, loader hands, or robotic hands are known. For example, in the case of a vertical lathe, as shown in FIG. 16, one cycle of an exchange of workpieces is given by the following process: when machining is finished, a headstock 51 moves from the machining section to a position above a conveyer 52. The headstock 51 moves down and a chuck 53 puts down the finished work piece WA on the conveyer 52. The headstock 51 moves up and waits above the conveyer 52. The conveyer 52 carries the finished workpiece WA away and delivers an unfinished workpiece WB. The headstock 51 moves down again and the chuck 53 grasps the unfinished workpiece WB. The headstock 51 moves up and then moves to the processing section, thus terminating the cycle.

In conventional vertical lathes, the exchange of workpieces is done by the movement of the headstock 51. So that the headstock 51 is required to reciprocate twice per cycle in a vertical Z-axis direction and the headstock 51 is also required to wait while the conveyer 52 is running. Accordingly, there is the problem that it takes a long time to exchange workpieces.

Therefore, it is a purpose of the present invention to provide an apparatus for exchanging workpieces of a machine tool that reduces the time required for exchanging workpieces, by cutting down the moving distance and the waiting time of a workpiece transport means to a minimum.

SUMMARY OF THE INVENTION

In order to solve these problems an apparatus for exchanging workpieces in accordance with a first aspect of the present invention includes a conveyer for conveying workpieces; a transport means for transporting the workpieces between a machining section and a place near the conveyer; a waiting station where unfinished workpieces wait near a conveyer; a first transferring system for transferring unfinished workpieces from the conveyer to the waiting station; a second transferring system for transferring finished workpieces from the transport means to the conveyer; and a third transferring system for transferring unfinished workpieces from the waiting station to the transport means.

An apparatus for exchanging workpieces in accordance with a second aspect of the present invention includes a conveyer for conveying workpieces horizontally in a first axis direction; a transport means for transporting workpieces between a machining section and a place near the conveyer by a horizontal movement in a second axis direction that intersects with the horizontal first axis direction; a waiting station where unfinished workpieces wait next to the conveyer at a position on the second axis; a first transferring system for transferring unfinished workpieces from a position on the second axis of the conveyer to the waiting station; a second transferring system for receiving finished workpieces from the transport means at a position above the waiting station by a movement within a vertical plane including the second axis, and transferring the workpieces to the conveyer; and a third transferring system for transferring unfinished workpieces from the waiting station to the transport means by a vertical movement.

An apparatus for exchanging workpieces in accordance with a third aspect of the present invention includes a conveyer for conveying workpieces horizontally in the first axis direction; a transport means for transporting workpieces between a machining section and a place near the conveyer by a horizontal movement in a second axis direction that intersects the horizontal first axis direction; a waiting station where unfinished workpieces wait next to a conveyer at a position on the second axis; a first transferring system transferring unfinished workpieces from a position on the second axis of the conveyer to the waiting station; a second transferring system receiving finished workpieces from the transport means by a vertical movement above the conveyer, and transferring the workpieces to the conveyer, at an intersection of the first axis and the second axis; and a third transferring system transferring unfinished workpieces from the waiting station to the transport means by a vertical movement.

In accordance with a fourth aspect of the present invention, in an apparatus for exchanging workpieces as in any of the first to third aspects, the transport means is a headstock of a machine tool having, at its lower part, a chuck that is able to hold workpieces.

DESCRIPTION OF THE PREFERRED EMBODIMENTS

Figure 1:
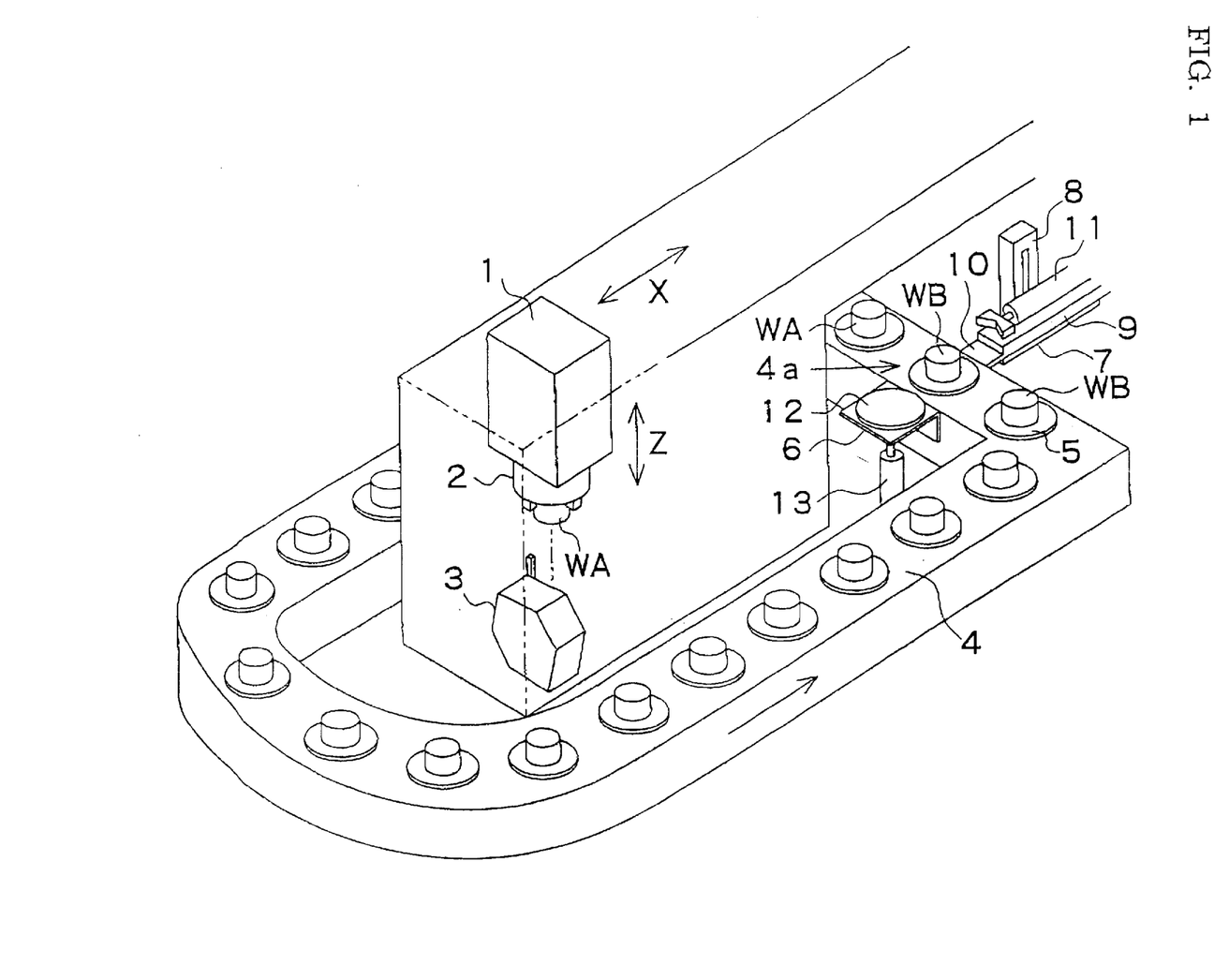
FIG. 1 is a perspective view of a vertical lathe according to an embodiment of the present invention.

The following is an explanation of an embodiment of a vertical lathe in accordance with the present invention, with reference to the accompanying drawings. As shown in FIG. 1, in this vertical lathe, a headstock 1 and a chuck 2 constitute a workpiece transport means. With an X-axis movement of the headstock 1, the chuck 2 conveys finished workpieces WA and unfinished work pieces WB between a machining section near a tool rest 3 and a conveyer 4.

The conveyer 4 is set around the vertical lathe as a loop, conveying a multitude of palettes 5 intermittently, taking finished workpieces WA from a workpiece exchanging position 4a and delivering unfinished workpieces WB to the workpiece exchanging position 4a. The workpiece exchanging position 4a is established on the intersection between the path of the headstock 1 in the X-axis direction and the conveyer 4.

Figure 2:
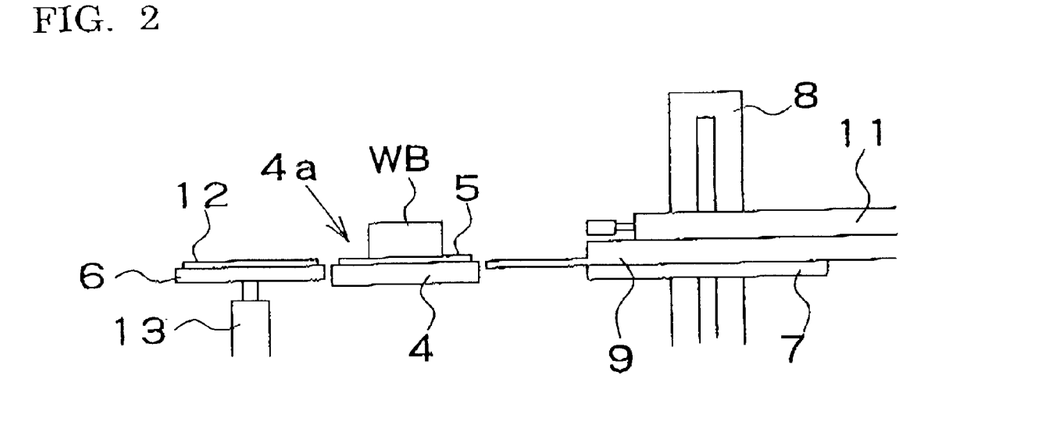
FIG. 2 is a front view of an apparatus for exchanging workpieces of the lathe of FIG. 1.

As shown in FIG. 1 and FIG. 2, at the workpiece exchanging position 4a on the inner side of the conveyer 4, a waiting station 6 is established where unfinished work pieces WB wait next to the conveyer 4. An elevating plate 7 that can be elevated along a pillar 8 is arranged on the outer side of the conveyor 4, and a slider 9 that can be moved horizontally in the X-axis direction is supported on the elevating plate 7.

At the pointed end of the slider 9, a carrier 10 is provided, for moving the finished work piece WA. On the slider 9, a shift cylinder 11 is provided horizontally that is driven pneumatically or hydraulically. The shift cylinder 11 constitutes a first transferring system for transferring an unfinished work piece WB from the conveyer 4 to the waiting station 6. The elevating plate 7 and the slider 9 constitute a second transferring system for transferring a finished work piece from the chuck 2 to the conveyer 4.

A palette 12 on which the unfinished work piece WB is disposed in the waiting station 6, together with a vertical lift cylinder 13 for elevating the palette 12, that is driven pneumatically or hydraulically. The lift cylinder 13 constitutes a third transferring system for transferring the unfinished workpiece WB from the waiting station 6 to the chuck 2.

The apparatus for exchanging workpieces described above exchanges workpieces according to the following procedure:

① As shown in FIG. 2, during the machining, the conveyer 4 carries an unfinished workpiece WB to the workpiece exchanging position 4a.

Figure 3:
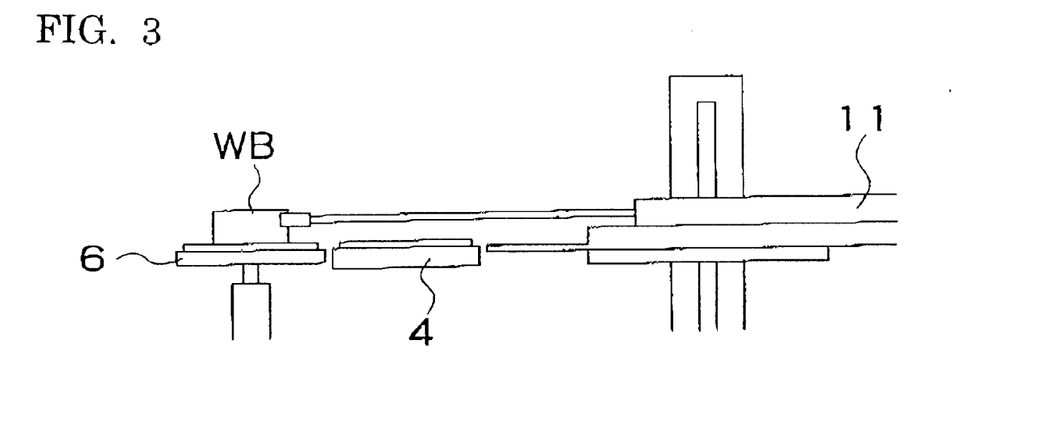
FIG. 3 is a diagram of an operation of the apparatus of FIG. 2

② As shown in FIG. 3, the shift cylinder 11 transfers the unfinished workpiece WB from the conveyer 4 to the waiting station 6.

Figure 4:
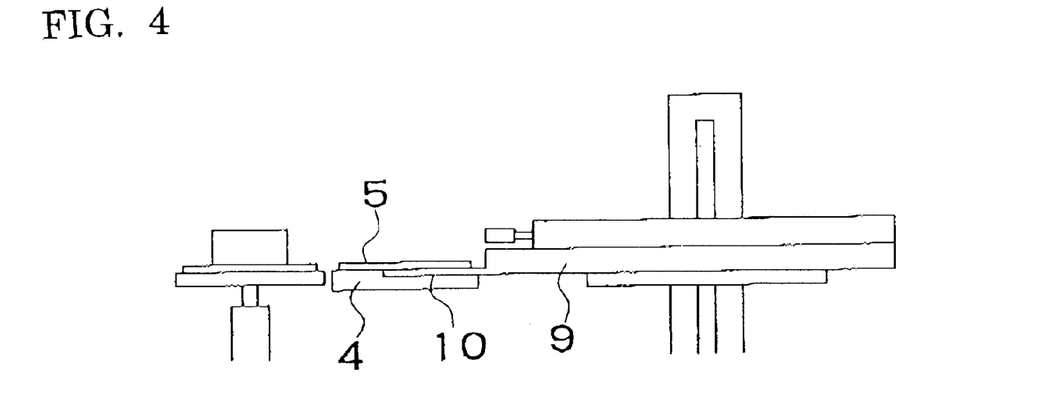
FIG. 4 is a diagram of the operation following FIG. 3.

③ As shown in FIG. 4, the slider 9 moves forward and the carrier 10 holds an empty palette 5 on the conveyer 4.

Figure 5:
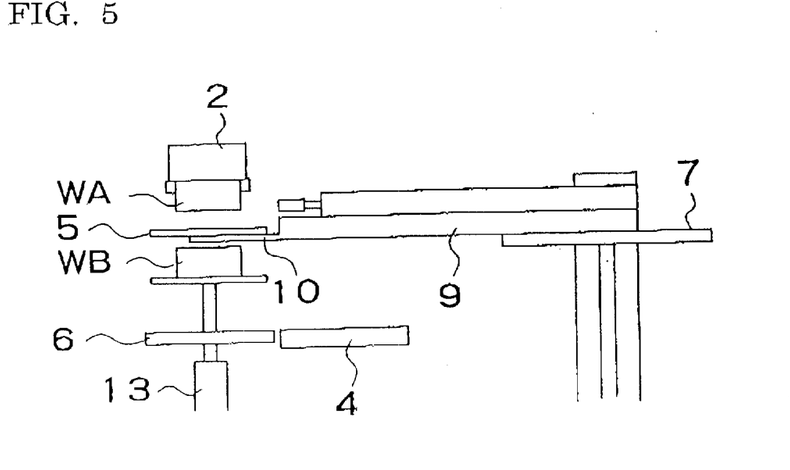
FIG. 5 is a diagram of the operation following FIG. 4.

④ As shown in FIG. 5, the elevating plate 7 moves up, the slider 9 moves forward and the carrier 10 carries empty palette 5 to a position above the waiting station 6. The headstock 1 that has finished the machining moves toward the conveyer 4 and the chuck 2 transports the finished workpiece WA to a position right above the palette 5. The lift cylinder 13 extends and places the unfinished work piece WB right below the palette 5.

Figure 6:
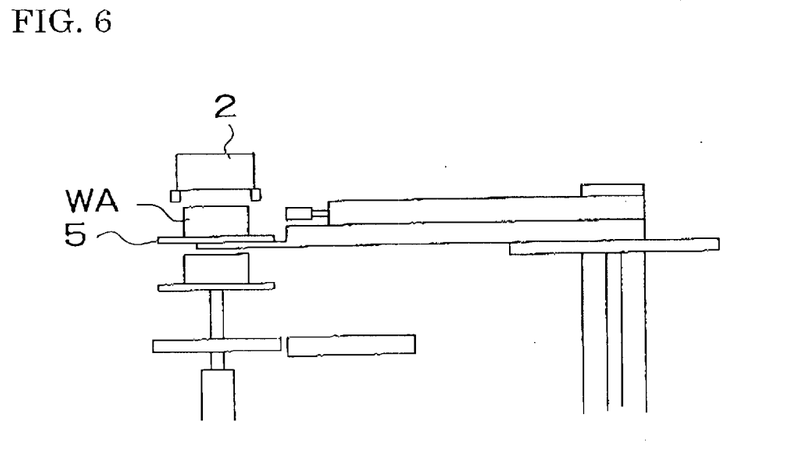
FIG. 6 is a diagram of the operation following FIG. 5.

⑤ As shown in FIG. 6, the chuck 2 puts down the finished workpiece WA on the palette 5.

Figure 7:
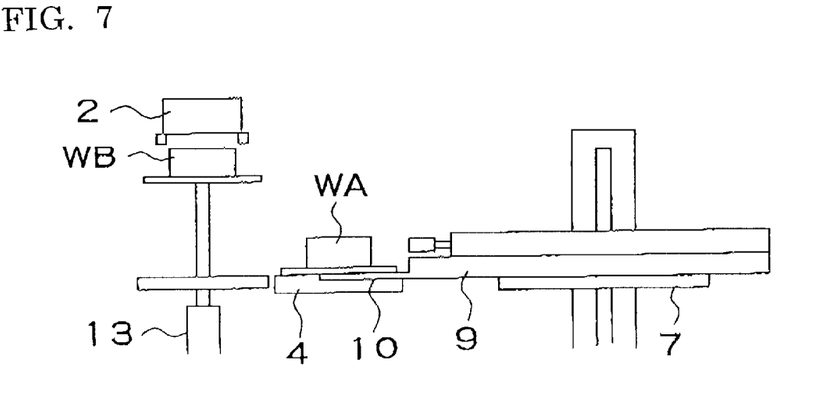
FIG. 7 is a diagram of the operation following FIG. 6.

⑥ As shown in FIG. 7, the slider 9 retreats, the elevating plate 7 moves down and the carrier 10 carries the finished workpiece WA to the conveyer 4. The lift cylinder 13 extends and places the unfinished workpiece WB right below the chuck 2.

Figure 8:
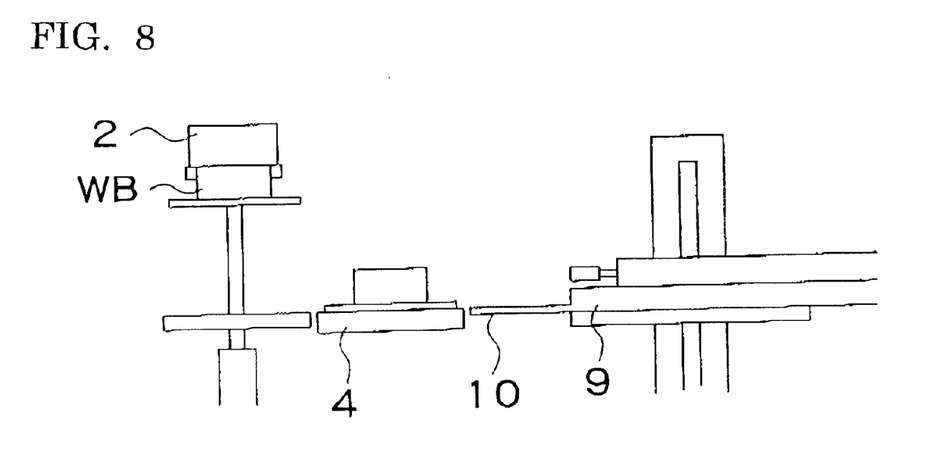
FIG. 8 is a diagram of the operation following FIG. 7.

⑦ As shown in FIG. 8, the chuck 2 grasps the unfinished workpiece WB, the slider 9 retreats and the carrier 10 moves away from the conveyer 4.

Figure 9:
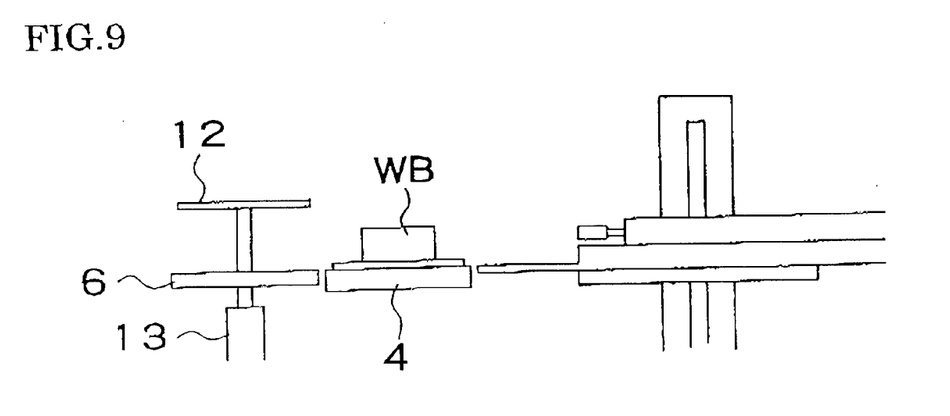
FIG. 9 is a diagram of the operation following FIG. 8.

⑧ As shown in FIG. 9, the headstock 1 moves toward the tool rest 3 and the lift cylinder 13 contracts and returns the palette 12 to the waiting station 6. After the conveyer 4 has carried away the finished workpiece, the next unfinished workpiece WB is carried in.

The above constitutes one cycle of the exchange of workpieces.

As described above, in the apparatus for exchanging workpieces of the embodiment of the present invention, due to the coordinated operation of the elevating plate 7, the slider 9, the shift cylinder 11 and the lift cylinder 13, unloading of the finished workpiece WA and loading of the unfinished workpiece WB are carried out successively. As a result, the moving distance and the waiting time of the headstock 1 are cut down to the minimum, and the time required for the exchange of workpieces is reduced greatly compared with the related art.

FIG. 10 to FIG. 15 show another embodiment of the apparatus for exchanging workpieces. In this apparatus, the shift cylinder 11 is arranged at a position outside the conveyer 4. Underneath the conveyer 4, a carrier cylinder 15 is disposed vertically, which constitutes a second transferring system for transferring the finished workpiece WA from the chuck 2 to the conveyer 4. The rest of the configuration is similar to the above-described embodiment.

This apparatus for exchanging workpieces exchanges workpieces according to the following procedure.

Figure 10:
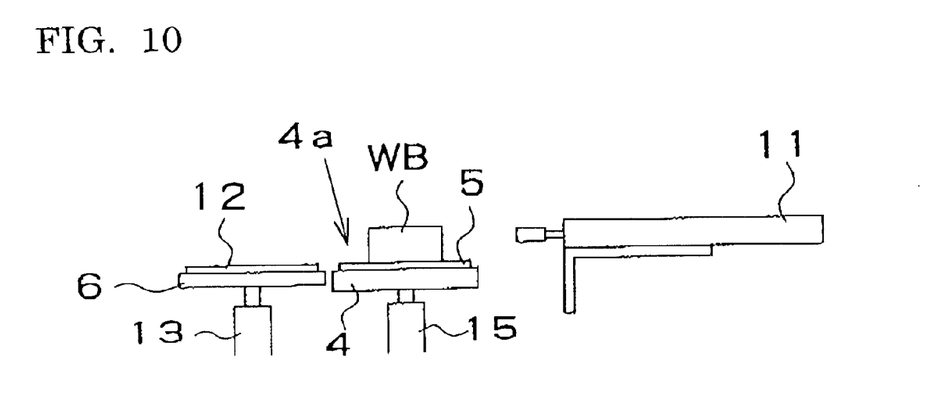
FIG. 10 is a front view of another embodiment of the apparatus for exchanging workpieces.

① As shown in FIG. 10, during the machining, the conveyer 4 carries the unfinished workpiece WB to the workpiece exchanging position 4a.

Figure 11:
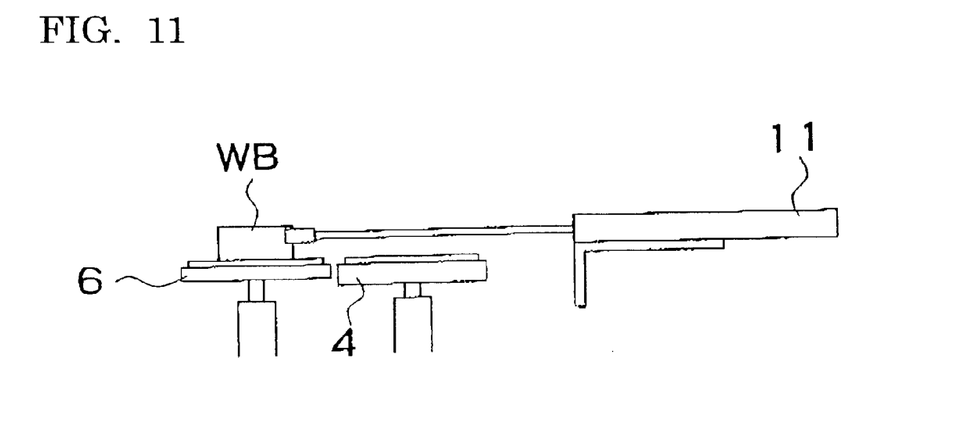
FIG. 11 is a diagram of an operation of the apparatus of FIG. 10.

② As shown in FIG. 11, the shift cylinder 11 transfers the unfinished workpiece WB from the conveyer 4 to the waiting station 6.

Figure 12:
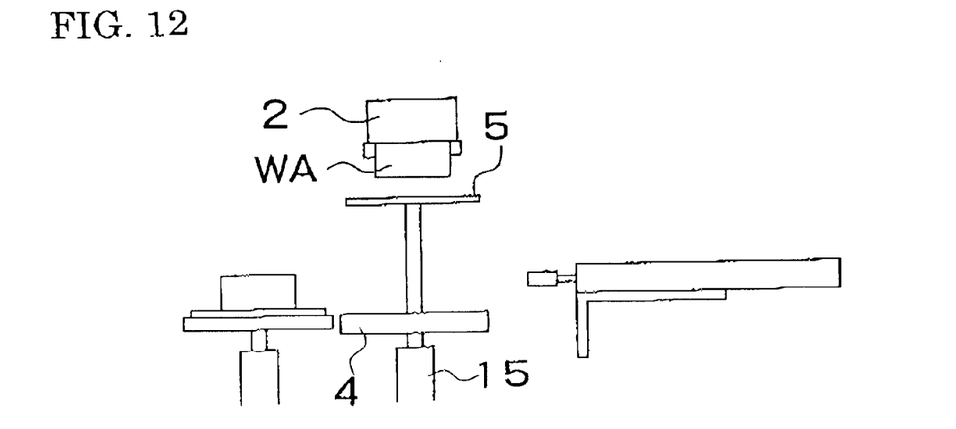
FIG. 12 is a diagram of the operation following FIG. 11.

③ As shown in FIG. 12, the carrier cylinder 15 expands and elevates the palette 5. The headstock 1, which has finished machining, moves toward the conveyer 4, and the chuck 2 conveys the finished workpiece WA to a position right above the palette 5.

Figure 13:
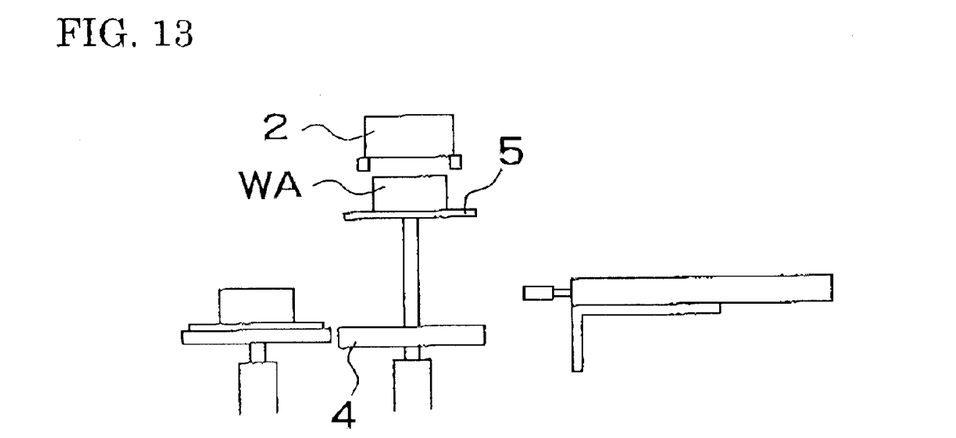
FIG. 13 is a diagram of the operation following FIG. 12.

④ As shown in FIG. 13, the chuck 2 puts down the finished workpiece WA on the palette 5.

Figure 14:
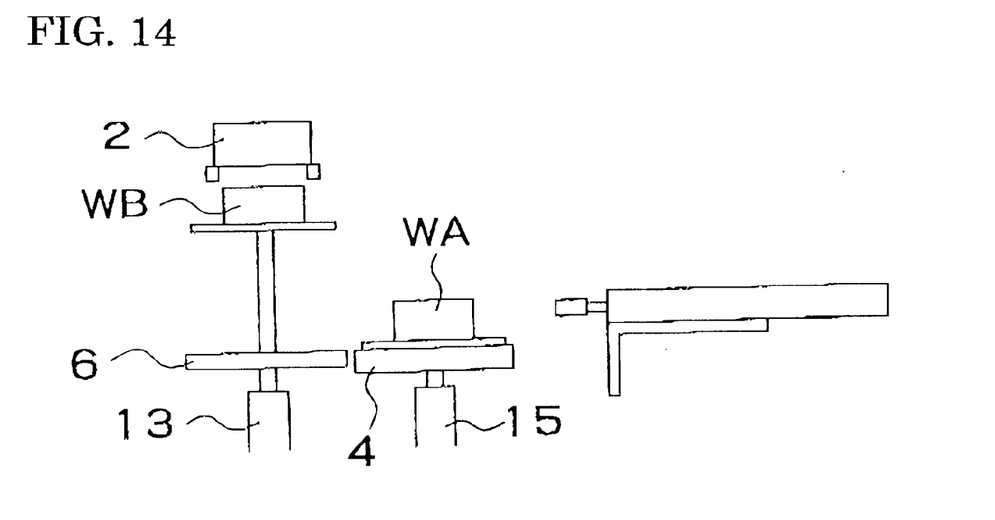
FIG. 14 is a diagram of the operation following FIG. 13.

⑤ As shown in FIG. 14, the carrier cylinder 15 contracts and puts down the finished workpiece WA on the conveyer 4. The headstock 1 moves to the point right above the waiting station 6 and the lift cylinder 13 expands and places the unfinished workpiece WB to the position right below the chuck 2.

Figure 15:
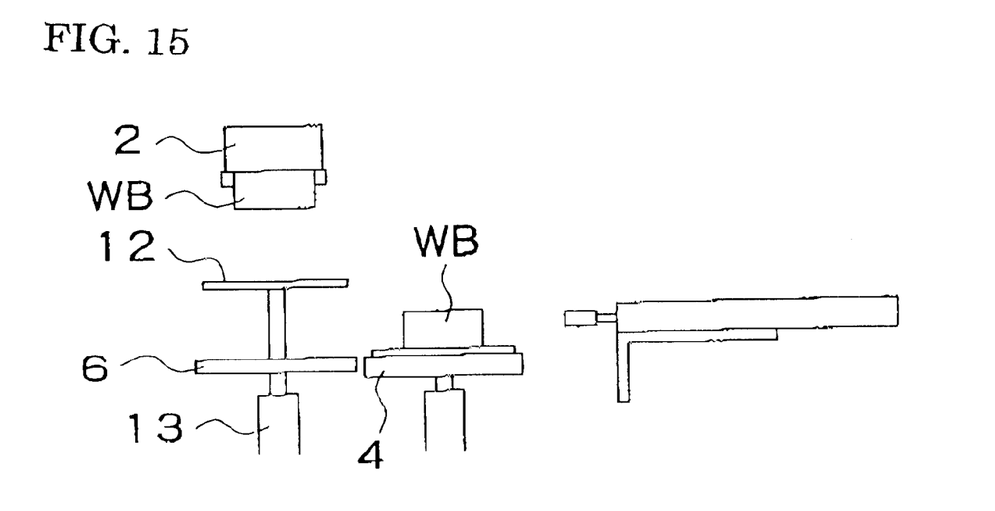
FIG. 15 is a diagram of the operation following FIG. 14.

⑥ As shown in FIG. 15, the chuck 2 grasps the unfinished workpiece WB and the headstock 1 moves toward the tool rest 3. The lift cylinder 13 contracts and returns the palette 12 to the waiting station 6. After the conveyer 4 has carried away the finished workpiece WA, the next unfinished workpiece WB is carried in.

The above constitutes one cycle of the exchange of workpieces.

Therefore, also with the apparatus for exchanging workpieces of this embodiment, due to the coordinated operation of the shift cylinder 11, lift cylinder 13 and the carrier cylinder 15, unloading of the finished workpiece WA and loading of the unfinished workpiece WB can be carried out in a short period of time. In addition, since the finished workpiece WA is conveyed by the carrier cylinder 15, the second transferring system can be attained with a simpler configuration than in the previously described embodiment.

The present invention is not limited to the above embodiments and it is also possible to change shapes and configuration of sectional elements as appropriate without departing from the spirit or essential characteristics of the present invention. As examples of alternative embodiments, it is possible to transport the workpieces by loader hands or robotic hands, to use a linear conveyer, or to apply different kinds of machine tools other than the vertical lathe.

As described above in detail, according to the apparatus for exchanging workpieces of the first aspect or the second aspect of the present invention, unloading of the finished workpiece WA and loading of the unfinished workpiece WB are operated successively due to the coordinated operation of the first to third transferring systems, so that an advantageous effect is achieved in that the moving distance and the waiting time of the workpiece conveying means are cut down to the minimum and the time required for exchanging workpieces is reduced.

Moreover, according to the apparatus for exchanging workpieces of a third aspect of the present invention, only the second transferring system is required to move up, and therefore, the configuration of the apparatus can be simpler. Furthermore, in the apparatus for exchanging workpieces of the fourth aspect of the present invention, the headstock of the tool machine is built in the machine tool as a workpiece transport means, so that all the equipment including the conveyer is compact and can be provided at low cost.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. An apparatus for exchanging workpieces, comprising:
   a conveyer for conveying workpieces horizontally in a first axis direction;
   a transport means for transporting workpieces between a machining section and a place near the conveyer by a horizontal movement in a second axis direction that intersects with the horizontal first axis direction;
   a waiting station where unfinished workpieces wait next to the conveyer at a position on the second axis;
   a first transferring system for transferring unfinished workpieces from a position on the second axis of the conveyer to the waiting station;
   a second transferring system for receiving finished workpieces from the transport means at a position above the waiting station by a movement within a vertical plane including the second axis, and transferring the workpieces to the conveyer; and
   a third transferring system for transferring unfinished workpieces from the waiting station to the transport means by a vertical movement.

2. An apparatus for exchanging workpieces, comprising:
   a conveyer for conveying workpieces horizontally in the first axis direction;
   a transport means for transporting workpieces between a machining section and a place near the conveyer by a horizontal movement in a second axis direction that intersects the horizontal first axis direction;
   a waiting station where unfinished workpieces wait next to a conveyer at a position on the second axis,
   a first transferring system transferring unfinished workpieces from a position on the second axis of the conveyer to the waiting station;
   a second transferring system receiving finished workpieces from the transport means by a vertical movement above the conveyer, and transferring the workpieces to the conveyer, at an intersection of the first axis and the second axis; and
   a third transferring system transferring unfinished workpieces from the waiting station to the transport means by a vertical movement.

3. The apparatus for exchanging workpieces according to claim 1, wherein the transport means is a headstock of a machine tool having, at its lower part, a chuck that is able to hold workpieces.

4. The apparatus for exchanging workpieces according to claim 2, wherein the transport means is a headstock of a machine tool having, at its lower part, a chuck that is able to hold workpieces.

* * * * *